US005122576A

United States Patent [19]

White et al.

[11] Patent Number: 5,122,576

[45] Date of Patent: Jun. 16, 1992

[54] POLYPHENYLENE ETHER-POLYAMIDE COMPOSITIONS FROM DICARBOXYLATE-CAPPED POLYPHENYLENE ETHERS

[75] Inventors: Dwain M. White, Schenectady; Laura A. Socha, Troy, both of N.Y.

[73] Assignee: General Electric Company, Schenectady, N.Y.

[21] Appl. No.: 650,153

[22] Filed: Feb. 4, 1991

[51] Int. Cl.[5] .................... C08L 71/12; C08L 53/00; C08G 65/48

[52] U.S. Cl. .................................. 525/397; 525/68; 525/92; 525/132; 525/133; 525/905

[58] Field of Search .................. 525/397, 92, 905, 68, 525/132, 133

[56] References Cited

U.S. PATENT DOCUMENTS

| | | | |
|---|---|---|---|
| 4,315,086 | 2/1982 | Ueno et al. | 525/391 |
| 4,338,421 | 7/1982 | Maruyama et al. | 525/397 |
| 4,600,741 | 7/1986 | Aycock et al. | 524/139 |
| 4,642,358 | 2/1987 | Aycock et al. | 549/245 |
| 4,760,118 | 7/1988 | White et al. | 525/397 |
| 4,808,671 | 2/1989 | Sivavec | 525/397 |
| 4,873,286 | 10/1989 | Gallucci et al. | 525/92 |
| 4,988,775 | 1/1991 | Sivavec et al. | 525/397 |

*Primary Examiner*—James J. Seidleck
*Assistant Examiner*—Thomas Hamilton, III
*Attorney, Agent, or Firm*—William H. Pittman; James C. Davis, Jr.

[57] ABSTRACT

Disclosed are polymer blends and compolymers of polyphenylene ethers, functionalized by copolymers of dicarboxylic acid and salicylic acid, which react with polyamides and are capable of compatibilizing blends of polyphenylene ethers and polyamides.

14 Claims, No Drawings

POLYPHENYLENE ETHER-POLYAMIDE COMPOSITIONS FROM DICARBOXYLATE-CAPPED POLYPHENYLENE ETHERS

This invention relates to polyphenylene ether polyamide compositions, and more particularly to such compositions prepared from polyphenylene ethers functionalized with copolymers of salicylic acid and dicarboxylic acid.

Polyphenylene ethers are a well known class of polymers, characterized by a unique combination of chemical, physical and electrical properties over a temperature range of more than 350° C., extending from a brittle point of about −170° C. to a heat distortion temperature of about 190° C. This combination of properties renders them suitable for use as engineering thermoplastics in a broad range of applications which are well known in the art and are disclosed in numerous patents and other publications.

In recent years, there has been considerable interest in combining polyphenylene ethers with other resins to produce compositions with even more advantageous properties. For example, such polymers as polyamides are frequently noted for their solvent resistance, and blends of such polymers with polyphenylene ethers might be expected to possess the advantageous properties of the latter and in addition be highly resistant to solvents. However, simple blends of polyphenylene ethers and polyamides are generally incompatible, frequently undergoing phase separation and delamination. They typically contain large, incompletely dispersed polyphenylene ether particles and no phase interaction between the two resin phases.

A successful approach to compatibilization of polyphenylene ethers with polyamides involves functionalization of the polyphenylene ether by reaction with a molecule containing, for example, carboxylic acid groups.

The groups can then undergo reaction with the polyamide to form a copolymer. In addition to being inherently stable, such copolymers serve as compatibilizers for blends of unfunctionalized polyphenylene ether with polyamide, thus improving such properties as impact strength and tensile strength.

U.S. Pat. No. 4,642,358 describes the reaction of polyphenylene ethers with such polycarboxylic reactants as trimellitic anhydride acid chloride (TAAC). The product is useful as a compatibilizer for polyphenylene ether-polyamide blends, as disclosed and claimed in U.S. Pat. No. 4,600,741.

A disadvantage of the reaction of polyphenylene ethers with TAAC is that it must be conducted in solution, typically in an organic solvent such as toluene. Polyphenylene ethers are often melt processed rather than solution processed, in which case the requirement of solution functionalization is undesirable. Moreover, the products prepared by this method frequently coagulate, contain large proportions of fines and have substantial chloride content. All of these conditions may be disadvantageous for many utilities of the resulting blends.

In U.S. Pat. No. 4,808,671, there is described the reaction of polyphenylene ethers with 4-esters of trimellitic anhydride in the presence of a catalytic amount of at least one triaryl phosphite. This process may be conducted in the melt, and may utilize such trimellitic acid esters are the 4(o-carbophenoxyphenyl) ester, also known as the 4-(phenyl salicylate) ester, of trimellitic anhydride. Esters of this type react with polyphenylene ethers in two ways: by functionalizing it with functionality derived from the 4-ester of trimellitic anhydride, and by capping unfunctionalized molecules with salicylate in accordance with U.S. Pat. No. 4,760,118. The disadvantage of this method is the requirement for triaryl phosphite catalysis in order to promote complete reaction. In the absence of triaryl phosphite, the functionalization reaction is incomplete and substantial proportions of residual trimellitic anhydride 4-ester may remain in the production, with possible detrimental results.

The present invention produces dicarboxylate/ salicylate-capped polyphenylene ethers which form blends with polyamides having high impact and tensile strength, high heat distortion temperature and other advantageous properties.

Accordingly, in one of its aspects the present invention relates to compositions containing copolymers of polyamides and salicylate/dicarboxylate-capped polyphenylene ether. Such compositions contain from about 25% to about 95% polyamide and preferably from about 30% to about 70% polyamide. The salicylate/-dicarboxylate-capped polyphenylene ether and the polyamide react to form a copolymer present in the final blend which acts as a compatibilizing agent.

The capped polyphenylene ethers used in the present invention, disclosed and claimed in commonly assigned and copending application Ser. No. 07/650,128 include polyphenylene ether molecules having end groups of formula

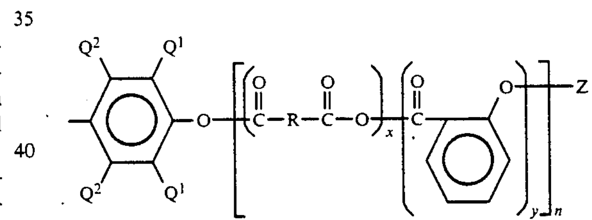

wherein R is a radical such that a stable intramolecular anhydride is not formed, Z is hydrogen or $COCH_3$, x, y, and n are independently greater than or equal to one, and each $Q^1$ is independently halogen, primary or secondary lower alkyl, phenyl, haloalkyl, aminoalkyl, hydrocarbonoxy or halohydrocarbonoxy wherein at least two carbon atoms separate the halogen and oxygen atoms; and each $Q^2$ is independently hydrogen, halogen, primary or secondary lower alkyl,phenyl, haloalkyl, hydrocarbonoxy or halohydrocarbonoxy as defined for $Q^1$;

Suitable R values include

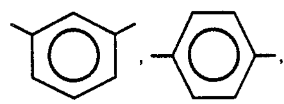

$(CH_2)m$ and trans —CH=CH—wherein m is at least four.

The polyphenylene ethers employed in the present invention are widely used in industry, especially as engineering plastics in applications requiring toughness and heat resistance. Since their discovery, they have given rise to numerous variations and modifications all of which are applicable to the present invention, including but not limited to those described hereinafter.

The polyphenylene ethers comprise a plurality of structural units having the formula

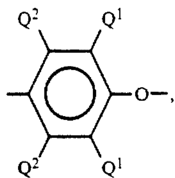

(II)

In each of the units independently, each $Q^1$ is independently halogen, primary or secondary lower alkyl (i.e., alkyl containing up to 7 carbon atoms), phenyl, haloalkyl, aminoalkyl, hydrocarbonoxy or halohydrocarbonoxy wherein at least two carbon atoms separate the halogen and oxygen atoms; and each $Q^2$ is independently hydrogen, halogen, primary or secondary lower alkyl. phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene) or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of a hydroxy group and the coupling agent, provided substantial proportions of free hydroxy groups remain present. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.35–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether) and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, hydroxyoximes (monomeric and polymeric), o-hydroxyaryl oxides and diketones. Also useful are known cobalt-containing catalyst systems for polyphenylene ether preparation are known in the art by reason of disclosure in numerous patents and publications.

Particularly useful polyphenylene ethers for the purposes of this invention are those which comprise molecules having at least one of the end groups of the formulas

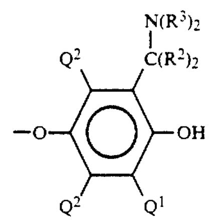

(III)

and

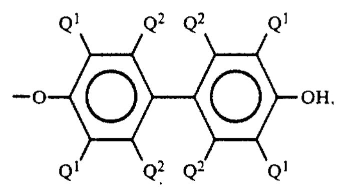

(IV)

wherein $Q^1$ and $Q^2$ are as previously defined; each $R^2$ is independently hydrogen or alkyl with the proviso that the total number of carbon a toms in both $R^2$ radicals is 6 or less; and each $R^3$ is independently hydrogen or a $C_{1-6}$ primary alkyl radical. Preferably, each $R^2$ is hydrogen and each $R^3$ is alkyl, especially methyl or n-butyl.

Polymers containing t he aminoalkyl-substituted end groups of formula III may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the hydrogen atom on one or more $Q^1$ radicals. The principal site of reaction is the $Q^1$ radical adjacent to the hydroxy groups of the terminal unit of the polymer chain. During further processing and/or blending, the aminoalkyl-substituted end groups may undergo various reactions, probably involving a quinone methide-type intermediate of the formula

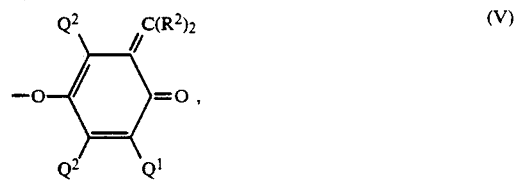

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula VI are typically obtained from reaction mixtures in which a by-product diphenoquinone of the formula

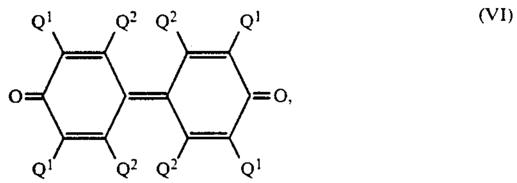

is present, especially in a copper-halide-secondary or tertiary amine system. In this regard, the disclosure of U.S. Pat. No. 4,477,649 is again pertinent as are those of U.S. Pat. No. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas III and VI. It should be understood, however, that other end groups may be present and that the invention in its broadest sense may not be independent on the molecular structures of the polyphenylene ether end groups.

It will be apparent to those skilled in the art from the foregoing that the polyphenylene ethers contemplated for use in the present invention include all those presently known, irrespective of variations in structural units of ancillary chemical features.

To produce the capped polyphenylene ethers used in the present invention a preformed copolymer made from salicylic acid and dicarboxylic acid described herein below is reacted with at least one polyphenylene ether. The polyphenylene ether may also undergo pre-extrusion with vacuum venting to remove amines and other impurities that can react with the capping agent, thus providing a more stable capping group on the polyphenylene ether. The preferred polyphenylene ether of the present invention is poly(2,6-dimethyl-1,4-phenylene ether). To produce the capped polyphenylene ethers of the present invention the salicylic acid/-dicarboxylic acid copolymer is preferably added to the polyphenylene ether or optionally the pre-extruded polyphenylene ether for extrusion.

While not critical, the amount of dicarboxylic acid salicylic acid copolymer present is about 1% to about 10% based on weight of the polyphenylene ether present. The ratio of salicylic acid to dicarboxylic acid ranges from about 3:1 to about 1:3. The reaction occurs at a temperature ranging from about 250° C. to about 350° C.

The copolymer of dicarboxylic acid and salicylic acid useful in the present invention has structural units of the formula:

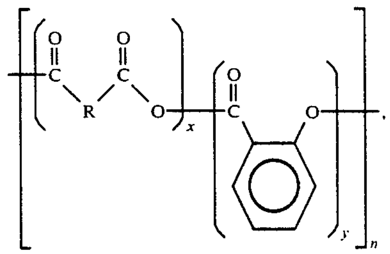

wherein R, x, y, and n are as previously defined hereinabove. The copolymers of the present invention may be produced by contacting salicylic acid, dicarboxylic acid and at least one acetic anhydride, wherein the acetic anhydride is present in a molar ratio of 1:1 with respect to the salicylic and dicarboxylic acid present, at a temperature and pressure sufficient to distill off the acetic acid and any excess acetic anhydride. In accordance with the method of the present invention the reaction is preferably heated at reflux at about 140° C. for about 10 to about 20 hours and then the acetic acid is distilled off under vacuum conditions. A suitable amount of salicylic acid present in accordance with the present invention ranges from about 25 to about 75 weight percent of the reaction mixture. Preferably the amount of salicylic acid and dicarboxylic acid present in the reaction mixture is about 50 percent respectively. Dicarboxylic acids preferable for use in the present invention include isophthalic acid, terephthalic acid, fumaric acid and aliphatic acids having at least 7 carbon atoms. Salicylic acids useful in the present invention are commercially available from Monsanto. The above mentioned copolymers are disclosed and claimed in commonly assigned and copending application 07/650,114.

Polyamides suitable for use in the preparation of the compositions of this invention may be made by any known method, including the polymerization of a monoaminomonocarboxylic acid or a lactam thereof having at least 2 carbon atoms between the amino and carboxylic acid or a lactam thereof as defined above together with substantially equimolar proportions of a diamine and a dicarboxylic acid. (The term "substantially equimolar" proportions includes both strictly equimolar proportions and slight departures therefrom which are involved in conventional techniques for stabilizing the viscosity of the resultant polyamides.) The dicarboxylic acid may be used in the form of a functional derivative thereof, for example, an ester or acid chloride.

Examples of the aforementioned monoaminomonocarboxylic acids or lactams thereof which are useful in preparing the polyamides include those compounds containing from 2 to 16 carbon atoms between the amino and carboxylic acid groups, said carbon atoms forming a ring with the —CO—NH— group in the case of a lactam. Particular examples of aminocarboxylic acids and lactams are ε-aminocaproic acid, butyrolactam, pivalolactam, ε-caprolactam, capryllactam, enantholactam, undecanolactam, dodecanolactam and 3- and 4-aminobenzoic acids.

Diamines suitable for use in the preparation of the polyamides include the straight chain and branched chain alkyl, aryl and alkaryl diamines. Such diamines include, for example, those represented by the general formula $$H_2N(CH_2)_nNH_2$$

wherein n is an integer of from 2 to 16. Illustrative diamines are trimethylenediamine, tetramethylenediamine, pentamethylenediamine, octamethylenediamine, hexamethylenediamine (which is often preferred), trimethylhexamethylenediamine, m-phenylenediamine and m-xylylenediamine.

The dicarboxylic acids may be represented by the formula

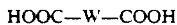
HOOC—W—COOH wherein W is a divalent aliphatic or aromatic group containing at least 2 carbon atoms. Examples of aliphatic acids are sebacic acid, octadecanedioic acid, suberic acid, glutaric acid, pimelic acid and adipic acid. Examples of aromatic acids are isophthalic and terephthalic acids.

Typical examples of the polyamides or nylons, as these are often called, include polyamide-6, 66, 11, 12, 63, 64, 6/10 and 6/12 as well as polyamides from terephthalic acid and/or isophthalic acid and trimethylhexamethylenediamine; from adipic acid and mxylylenediamines; from adipic acid, azelaic acid and 2,2-bis(p-aminocyclohexyl)propane and from terephthalic acid and 4,4'-diaminodicyclohexylmethane. Mixtures and/or copolymers of two or more of the foregoing polyamides or prepolymers thereof, respectively are also within the scope of the present invention. Preferred polyamides are polyamide-6, 66, 11 and 12, most preferably polyamide-66.

Copolymer formation according to the invention is believed to be the result of reaction between carboxylic groups on the dicarboxyl end groups of the polyphenylene ether and amine groups in the polyamide, forming amide linkages. Accordingly, the presence of a substantial proportion of amine end groups in the polyamide is preferred. If such amine end groups are not present in substantial proportion, partial degradation of the polyamide is necessary to enable the formation of the desired copolymers.

To prepare the copolymer compositions, the dicarboxylate-capped polyphenylene ether and polyamide are heated together in solution or, preferably, in the melt. Here, as in the operations previously described, melt processing under vacuum is especially preferred and extrusion with vacuum venting is most preferred. The reaction temperature is typically within the range of about 250° C.-350° C.

The proportions of functionalized polyphenylene ether and polyamide are not critical and may be adjusted over a wide range to yield copolymer compositions having the desired properties. The polyphenylene ether-polyamide compositions, however, generally contain about 5-75% by weight polyphenylene ether and about 25-95% polyamide.

In general, the compositions of this invention comprise only partially copolymer, with the balance being a polyphenylene ether-polyamide blend. It is also within the scope of the invention to incorporate uncapped polyphenylene ether in the composition, said uncapped polyphenylene ether frequently comprising up to about 50% by weight of total polyphenylene ether.

The polyphenylene ether-polyamide compositions of this invention may also contain ingredients other than the copolymer, polyphenylene ether and polyamide. A particularly useful other ingredient in many instances is at least one elastomeric impact modifier which is compatible with the polyphenylene ether. It is generally present in the amount of about 5-25% by weight of resinous components.

Impact modifiers for polyphenylene ether-polyamide compositions are well known in the art. They are typically derived from one or more monomers selected from the group consisting of olefins, vinyl aromatic monomers, acrylic and alkylacrylic acids and their ester derivatives as well as conjugated dienes. Especially preferred impact modifiers are the rubbery high-molecular weight materials including natural and synthetic polymeric materials showing elasticity at room temperature. They include both homopolymers and copolymers, including random, block, radial block, graft and core-shell copolymers as well as combinations thereof.

A particularly useful class of impact modifiers are those derived from the vinyl aromatic monomers. These include, for example, modified polystyrenes, ABS type graft copolymers, AB and ABA type block and radial block copolymers and vinyl aromatic conjugated diene core shell graft copolymers. Modified polystyrenes include rubber modified polystyrenes, such as butadiene rubber-modified polystyrene (otherwise referred to as high impact polystyrene or HIPS). Additional useful polystyrenes include copolymers of styrene and various monomers, including, for example styrene-butadiene copolymers as well as the modified alpha- and para-substituted styrenes and any of the styrene resins disclosed in U.S. Pat. No. 3,383,435, herein incorporated by reference. ABS types of graft copolymers are typified as comprising a rubber polymeric backbone derived from a conjugated diene alone or in combination with a monomer copolymerizable therewith having grafted thereon at least one monomer, and preferably two, selected from the group consisting of monoalkenylarene monomers and substituted derivatives thereof as well as acrylic monomers such as acrylonitriles and acrylic and alkylacrylic acids and their esters.

As especially preferred subclass of vinyl aromatic monomer-derived resins is the block copolymers comprising monoalkenyl arene (usually styrene) blocks and conjugated diene (e.g., butadiene or isoprene) blocks and represented as AB and ABA block copolymers. The conjugated diene blocks may be selectively hydrogenated.

Suitable AB type block copolymers are disclosed in, for example, U.S. Pat. Nos. 3,078,254; 3,402,159; 3,297,793; 3,265,765 and 3,594,452 and UK Patent 1,264,741, all incorporated herein by reference. Examples of typical species of AB block copolymers are polystyrene-polybutadiene (SRB), polystyrene-polyisoprene and poly (alpha-methylstyrene)-polybutadiene. Such AB block copolymers are available commercially from a number of sources, including Phillips Petroleum under the trademark SOLPRENE.

Additionally, ABA triblock copolymers and processes for their production as well as hydrogenation, if desired, are disclosed in U.S. Pat. Nos. 3,149,182; 3,231,635; 3,462,162; 3,287,333; 3,595,942; 3,694,523 and 3,842,029, all incorporated herein by reference.

Examples of triblock copolymers include polystyrene-polybutadiene-polystyrene (SBS), polystyrenepolyisoprene-polystyrene (SIS), poly(a-methylstyrene) polybutadiene-poly-(α-methylstyrene) and poly(α-methylstyrene)-polyisoprene-poly-(α-methylstyrene). Particularly preferred triblock copolymers are available commercially as CARIFLEX~, KRATON D~ and KRATON G~ from Shell.

Another class of impact modifiers is derived from conjugated dienes. While many copolymers containing conjugated dienes have been discussed above, additional conjugated diene modifier resins include, for example, homopolymers and copolymers of one or more conjugated dienes including, for example, polybutadiene, butadiene-styrene copolymers, butadiene-glycidyl methacrylate copolymers, isoprene-isobutylene copolymers, chlorobutadiene polymers, butadiene-acrylonitrile copolymers, polyisoprene, and the like. Ethylene-propylene-diene monomer rubbers may also be used. These EPDM'S are typified as comprising predominantly ethylene units, a moderate amount of propylene units and up to about 20 mole percent of non-conjugated diene monomer units. Many such EPDM's and processes for the production thereof are disclosed in U.S. Pat. Nos. 2,933,480; 3,000,866; 3,407,158; 3,093,621 and 3,379,701, incorporated herein by reference.

Other suitable impact modifiers are the core-shell type graft copolymers. In general, these have a predominantly conjugated diene rubbery core or a predominantly cross-linked acrylate rubbery core and one or more shells polymerized thereon and derived from monoalkenylarene and/or acrylic monomers alone or, preferably, in combination with other vinyl monomers. Such core-shell copolymers are widely available commercially, for example, from Rohm and Haas Company under the trade names KM611, KM-653 and KM-330, and are described in U.S. Pat. Nos. 3,808,180; 4,034,013; 4,096,202; 4,180,494 and 4,292,233.

Also useful are the core-shell copolymers wherein an interpenetrating network of the resins employed characterizes the interface between the core and shell. Especially preferred in this regard are the ASA type copolymers available from General Electric Company and sold as GELOY~ ® resin and described in U.S. Pat. No. 3,944,631.

In addition, there may be employed the above described polymers and copolymers having copolymerized therewith or grafted thereon monomers having functional groups and/or polar or active groups. Finally, other suitable impact modifiers include Thiokol rubber, polysulfide rubber, polyurethane rubber, polyether rubber (e.g., polypropylene oxide), epichlorohydrin rubber, ethylenepropylene rubber, thermoplastic polyester elastomers and thermoplastic etherester elastomers.

The preferred impact modifiers are block (typically diblock, triblock or radial teleblock) copolymers of alkenylaromatic compounds and olefins or dienes. Most often, at least one block is derived from styrene and at least one other block from at least one of butadiene, isoprene, ethylene and butylene. Especially preferred are the triblock copolymers with polystyrene end blocks and olefin- or diene derived midblocks. When one of the blocks is derived from three or more dienes, it is frequently advantageous to reduce the aliphatic unsaturation therein by selective hydrogenation. The weight average molecular weights of the impact modifiers are typically in the range of about 50,000–300,000. Block copolymers of this type are commercially available from Shell Chemical Company under the trademark KRATON, and include KRATON D1101, G1650, G1651, G1652, G1657 and G1702.

Other conventional ingredients which may be present in the copolymer-containing compositions of this invention include fillers, flame retardants, colorants, stabilizers, antistatic agents, mold release agents and the like, used in conventional amounts The presence of other resinous components is also contemplated.

In order that those skilled in the art may be better able to practice the present invention, the following examples are given as illustrations of the preparation of the polyphenylene ether/polyamide compositions of the present invention. It should be noted that the invention is not limited to the specific details embodied in the examples.

EXAMPLE 1

1058 g functionalized polyphenylene ether, 885 g polyamide-66 and 216 g Kraton 1651 rubber were dry blended and then extruded in a Werner-Pflieder 28 mm twin screw extruder with zone temperatures at 140°, 260°, 290°, 290°, 270°, 260° C. and a speed of 311 rpm. The smooth textured extruded strand was passed through a water bath and then into a pelletizer. The pellets were dried at 110° C. and injection molded into test bars using an Engel 28 ton injection molding machine. Similar extrusion and injection molding procedures were used for the other blends. Mechanical properties of a number of the blends are presented in Table 1.

The functionalized polyphenylene ether was prepared as follows. Capping reactions were carried out on pre-extruded polyphenylene ether. For the pre-extrusion, 45 pounds of commercial polyphenylene ether powder was fed into a 28 mm twin screw extruder equipped with a polyphenylene ether devolatilizing screw. Vacuum venting was employed and the throughput was 7.5 pounds per hour. The extruder zones were at the following temperatures 339°, 530°, 534°, 523°, 557°, 545° F. The extruded polyphenylene ether was pelletized and then dried for 4 hours at 110° C.

A dry blended mixture of the pre-extruded polyphenylene ether (commercial resin with an intrinsic viscosity of 0.46 dL/g) and of salicylate/isophthalate (3:1) copolymer was extruded in a Werner-Pflieder 28 mm twin screw extruder equipped with a vacuum venting port and a devolatilizing screw (zones 1–5: 180° C./290° C./300° C./310° C./310° C./; die: 320° C.) and the extrudate was pelletized with a mechanical chopper. A portion of the extrudate was pelletized with a mechanical chopper. The feed rates for the extrusions were about 9 pounds per hour. A portion of the extrudate (~40 g) was stirred in chloroform and the solution filtered to remove any trace of insoluble material. Addition of methanol to the filtrate caused the polymer to precipitate. It was washed with methanol and dried at 70° C. in a vacuum oven for 20 hours. One weight percent capping agent, based on the polyphenylene ether present was used. Injection molded bars were examined by scanning electron microscopy (SEM). One face of a bar was removed (⅛" trimmed off parallel to the sample surface). The surface was then microtomed and then the thin sections were etched for 3 minutes in a plasma etcher under oxygen. The etched samples were gold coated for 10-15 seconds and examined by SEM. The SEM photographs corresponded to enlargements of 500 to 10,000 times. Comparison with the control samples (made with unfunctionalized PPO) showed smaller sizes for the PPO domains than in the control indicating improved compatibilization. Cross sectional areas of the domains were approximately 5% the area of the domains in the control.

EXAMPLE 2

Example 2 was prepared in a manner similar to Example 1 except that 2 weight percent capping agent, based on the polyphenylene ether present was used. SEM analysis showed injection molded samples to be slightly better compatibilized than for those in Example 1.

EXAMPLE 3

Example 3 was prepared in a manner similar to Example 1 except that 4 weight percent capping agent, based on the polyphenylene ether present was used.

EXAMPLE 4

Example 4 was prepared in a manner similar to Example 1 except that the amount of salicylate present was in a 1:1 ratio with the isophthalate present.

EXAMPLE 5

Example 5 was prepared in a manner similar to Example 4 except that 2 weight percent capping agent, based on the polyphenylene ether present was used.

EXAMPLE 6

Example 6 was prepared in a manner similar to Example 4 except that 4 weight percent capping agent, based on the polyphenylene ether present was used.

Properties of the blends resulting from the co-extrusion of functionalized polyphenylene ethers with polyamide-66 are described in Table 1. The blends contained 49 wt % polyphenylene ethers, 41 wt % polyamide and 10 wt % Kraton 1651 rubber. With this composition the polyphenylene ether was the dispersed phase.

TABLE 1

Polyphenylene Ether/Polamade Blends

| Example | Type of Cap on PPO | % Capping Agent in PPO | Notched Izod (ft-lbs/in) | Max Strain (%) | Stress at Yield (psi) | Modulus (kpsi) |
|---|---|---|---|---|---|---|
| Control | None | 0 | 0.30 | 11.0 | 6785 | 110 |
| 1 | 75/SA/25/IA* | 1 | .35 | 17.7 | 8090 | 108 |
| 2 | 75/SA/25/IA | 2 | .22 | 11.1 | 6929 | 110 |
| 3 | 75/SA/25/IA | 4 | .21 | 8.2 | 4783 | 112 |
| 4 | 50/SA/50/IA* | 1 | 1.03 | 26.3 | 7935 | 108 |
| 5 | 50/SA/50/IA | 2 | .54 | 20.9 | 7875 | 108 |
| 6 | 50/SA/50/IA | 4 | .23 | 10.6 | 6538 | 107 |

*Initial composition of salicylic acid (SA) and isophthalic acid (IA) by weight used to prepare the copolymer capping reagent.

The largest effect occurred in polyphenylene ether that had been treated with 1 wt % functionalizing agent. Approximately three-fold increases in impact strength and elongation were found. Polyphenylene ether samples that had been prepared with higher levels of functionalizing agent may have contained sufficient quantities of by-products from the functionalization reaction to have caused appreciable degradation of the nylon chains. It is believed that if the functionalized polyphenylene ethers were purified by dissolution and precipitation, the samples with larger amounts of functionalization would probably be even more effective at compatibilizing the blends in Example 4.

Obviously, other modifications and variations of the present invention are possible in light of the above teachings. It is therefore to be under stood that changes may be made in particular embodiments of the invention described which are within the full intended scope of the invention as defined by the claims. It is to be understood further that all patents mentioned above are to be incorporated herein by reference.

What is claimed is:

1. A composition comprising a copolymer prepared from at least one polyamide and at least one capped polyphenylene ether having end groups of a preformed copolymer prepared from salicylic acid and dicarboxylic acid, said preformed copolymer having the formula

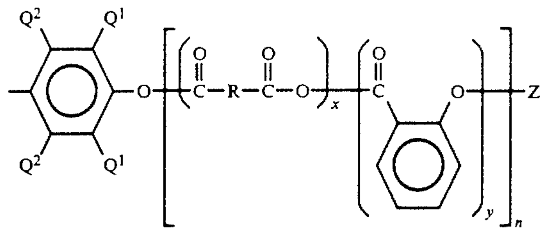

wherein R is

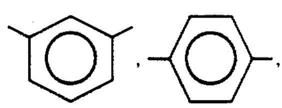

Z is hydrogen or $COCH_3$, x, y and n are independently greater than or equal to one, and each $Q^1$ is independently halogen, primary or secondary lower alkyl, phenyl, haloalkyl, aminoalkyl, hydrocarbonoxy or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined $Q^1$.

2. A composition according to claim 1 wherein the polyphenylene ether comprises a plurality of structural units having the formula

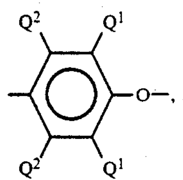

(II)

wherein each $Q^1$ is independently halogen, primary or secondary lower alkyl, phenyl, haloalkyl, aminoalkyl, hydrocarbonoxy or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

3. A composition according to claim 2 wherein the polyphenylene ether is a poly(2,6-dimethyl-1,4-phenylene ether).

4. A composition according to claim 3 wherein the polyamide is a polyamide-6 or a polyamide-66.

5. A composition according to claim 4 which comprises a copolymer prepared from about 5–75% by weight capped polyphenylene ether, about 25–95% polyamide, and uncapped polyphenylene ether in an amount up to about 0–75% by weight of total polyphenylene ether.

6. A composition according to claim 3 which also comprises an elastomeric impact modifier.

7. A composition according to claim 6 wherein the impact modifier is a triblock copolymer wherein the end blocks are derived from styrene and the midblock is derived from at least one of isoprene and butadiene.

8. A composition according to claim 7 wherein the midblock has been selectively hydrogenated.

9. A composition comprising a copolymer prepared from at least one polyamide and at least one capped polyphenylene ether, wherein the capped polyphenylene ether is formed by a method comprising reacting, at a temperature in the range of about 250°–350° C., at least one polyphenylene ether with a preformed copolymer made from salicylic acid and dicarboxylic acid selected from the group consisting of isophthalic acid, terephthalic acid, fumaric acid and dicarboxyalkanes having at least seven carbon atoms.

10. A composition according to claim 9 wherein the preformed copolymer is extruded with at least one polyphenylene ether.

11. A composition according to claim 9 wherein the preformed copolymer is extruded with vacuum venting with at least one pre-extruded polyphenylene ether.

12. A composition according to claim 1 wherein the amount of copolymer prepared from salicylic acid and dicarboxylic acid present is about 1% to about 10% based on weight of the polyphenylene ether present.

13. A composition according to claim 1 wherein the molar ratio of salicylate to dicarboxylate ranges from about 1:3 to about 3:1.

14. A composition according to claim 1 wherein the molar ratio or salicylate to dicarboxylate is about 1:1.

* * * * *